UNITED STATES PATENT OFFICE 2,549,684

METHOXY SUBSTITUTED 2-AMINO-INDANOLS

Richard V. Heinzelmann, Kalamazoo, Mich., assignor to The Upjohn Company, Kalamazoo, Mich., a corporation of Michigan No Drawing. Application September 29, 1948, Serial No. 51,870

6 Claims. (Cl. 260—570.5)

This invention relates to aminoindanols, particularly to certain 2-aminoindanols-1 having a single substituent on the aromatic ring of the indane nucleus and to acid addition salts thereof.

The new compounds with which the present invention is concerned are the mono-substituted aminoindanols which can be represented by the generic formula

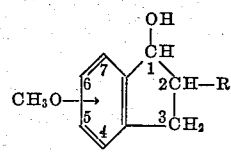

wherein the methoxy radical is a substituent replacing a hydrogen on one of the carbon atoms of the benzene ring and R is from the group consisting of the amino, monoalkylamino, lower di-n-alkylamino and monoaralkylamino radicals, and the acid addition salts thereof. By a "lower di-n-alkylamino radical" is meant a di-n-alkylamino radical wherein the alkyl groups each contain a straight carbon chain having less than four carbon atoms, such as the dimethylamino, diethylamino and di-n-propylamino radicals. Addition salts included within the scope of the invention include those formed with hydrochloric, hydrobromic, sulfuric, phosphoric, benzoic, propionic, succinic, citric and other acids.

Members of the new class of compounds described herein have been prepared and physical properties thereof determined whereby they can be identified. The salts are well defined crystalline compound which are generally soluble in water and alcohol and substantially insoluble in ether, benzene, carbon tetrachloride and ethyl acetate. They generally melt with decomposition. They can be recrystallized from alcohol or a mixture of alcohol and ether. The free amines are generally stable crystalline substances soluble in the common organic solvents. The new compounds are of value for their effects in the relaxation of constricted bronchi and in altering the blood pressure. The monomethoxy-2-aminoindanols-1 having no substituents on the amino nitrogen atom are of further value as intermediate from which the salts of N-substituted monomethoxy-2-aminoindanols-1 of the invention can be prepared.

The invention will be further described with particular reference to the salts of the monosubstituted aminoindanols it being understood, however, that the free mono-substituted aminoindanols are also contemplated. The free monosubstituted aminoindanols can be prepared readily by decomposing their salts with alkali in conventional manner and in other ways as will be apparent as the description proceeds.

The new salts herein described wherein R of the generic formula given represents the unsubstituted amino radical, i. e. salts of the monomethoxy-2-aminoindanols-1, can be prepared readily by reduction of the correspondingly substituted monomethoxy - 2 - aminoindanones - 1, preferably by hydrogenation under the influence of a hydrogenation catalyst. Compounds of the invention wherein R represents a substituted amino radical within the limits of the definition previously given can be prepared readily by reacting an appropriate monomethoxy-2-aminoindanol-1 with an aldehyde or ketone and hydrogenating the reaction product.

The reduction of a salt of monomethoxy-2-aminoindanone-1 to a salt of a monomethoxy-2-aminoindanol-1 is carried out conveniently by subjecting an aqueous solution of the salt to the action of hydrogen, preferably under super-atmospheric pressure and at from about 40° to about 70° C., in the presence of a hydrogenation catalyst, such as active palladium on charcoal or a platinum or platinum oxide catalyst. The hydrogenation reaction is usually substantially complete in from about two to about twelve hours, depending upon the reaction conditions. The acid addition salt of the monomethoxy-2-aminoindanol-1 can be isolated readily from the reaction mixture by filtering to remove the catalyst, evaporating the filtrate substantially to dryness and crystallizing the residue from a suitable solvent, such as a mixture of alcohol and ether. The salts are thus obtained as pure crystalline products.

The monomethoxy-2-aminoindanone-1 salts used as starting materials in the process of the present invention can be prepared readily according to the method of concurrently filed, co-pending application Serial No. 51,869, by subjecting a monomethoxy-2-isonitrosoindanone - 1, wherein the methoxy substituent is on the benzene ring of the indane nucleus, to the action of hydrogen under the influence of a catalyst, such as active palladium on charcoal or a platinum oxide or reduced platinum oxide similar to that generally referred to as the Adams catalyst, until 2 mols of hydrogen for each mol of isonitroso compound have been absorbed. The hydrogenation is carried out in an acid medium, such as anhydrous alcoholic hydrogen chloride, containing sufficient acid to form the acid addition salt of the aminoindanone as fast as it is formed. The hydrogenation of the isonitrosoindanone can be carried out at ordinary room temperatures although the speed of the reaction is increased by warming the mixture at from about 40° to about 70° C. The acid addition salt of the monomethoxy-2-aminoindanone-1 can be recovered in high yield by filtering the reaction mixture to remove the catalyst and then precipitating the salt from the filtrate by the addition of ether, ethyl acetate or other suitable liquid.

The monomethoxy-isonitrosoindanones from which the salts of the monomethoxy-2-aminoindanones-1 can be obtained are prepared readily from an appropriate monomethoxy-indanone-1 according to the method of Levin and Hartung, J. Org. Chem. 7, 408 (1942), by the simultaneous addition under anhydrous conditions of an alkyl nitrite and hydrogen chloride to an ethereal solution of a monomethoxy-indanone-1.

The reaction of an aldehyde or ketone with a monomethoxy-2-aminoindanol-1 and the hydrogenation of the resulting reaction product to form a salt an N-substituted monomethoxy-2-aminoindanol-1 can be carried out in a single operation, if desired. Thus an acid addition salt of a monomethoxy-2-aminoindanol-1 and an acid binding agent, such as sodium carbonate, potassium bicarbonate and the like, can be suspended or dissolved in alcohol and the aldehyde or ketone and the catalyst then added and the entire mixture subjected to hydrogenation, preferably at slightly elevated pressure and temperature. Satisfactory results have been obtained under a hydrogen pressure of about 2 to 3 atmospheres and at a temperature of from about 40° to about 50° C. Under such conditions, the theoretical quantity of hydrogen is generally absorbed in about one hour or less. The product is preferably recovered by filtering to remove the catalyst and then pouring the filtrate into a relatively large volume of ether containing an acid, such as hydrogen chloride or hydrogen bromide. Upon filtering the ethereal mixture, the acid addition salt of the monomethoxy-2-aminoindanol-1 is recovered in crystalline form and can be purified, if desired, by crystallization from a mixture of alcohol and ether.

It has been observed that when an aliphatic aldehyde containing less than about 4 carbon atoms is used in the process, a mixture of monoalkylamino and dialkylamino compounds is formed, the proportion of monoalkylamino compound being greater the greater the number of carbon atoms in the aliphatic aldehyde. When formaldehyde is used in the process the major portion of the product is a dimethylamino compound with only a small proportion of monomethylamino compound being formed. When propionaldehyde is used in the process, only a small proportion of the di-n-propylamino compound is formed the principal product being a mono-n-propylamino compound. When butyraldehyde or a higher aliphatic aldehyde is used in the process little if any of the dialkylamino compound is formed. When using aliphatic ketones only the branched chain monoalkylamino compounds are formed.

It has been further observed that when benzaldehyde is used in the process, an intermediate reaction product of the monomethoxy-2-aminoindanol-1 and benzaldehyde can be isolated. This intermediate compound appears to be a 2-phenol-monomethoxyindano-1',2'-oxazolidine having the formula

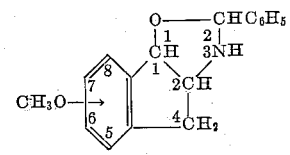

The reaction of a monomethoxy-2-aminoindanol-1 with benzaldehyde can be carried out readily by warming a mixture of an acid addition salt of the monomethoxy-2-aminoindanol-1 and benzaldehyde together with sufficient of an acid binding agent, such as sodium carbonate, potassium bicarbonate and the like, to combine with the acid of the acid addition salt. The reaction can be carried out without the use of a reaction medium, but is preferably carried out in a suitable liquid medium, such as alcohol or a mixture of alcohol and ethyl acetate. The mixture is usually heated, e. g. under reflux, for several hours and then cooled and filtered to remove crystallized sodium chloride. The 2-phenol-monomethoxyindano-1',2'-oxazolidine can be isolated readily from the reaction mixture by pouring the mixture into water to precipitate the oxazolidine and filtering or by evaporating the reaction mixture to dryness and washing the residue with water to remove inorganic salts. The new oxazolidines are well-defined crystalline compounds having sharp melting points and forming hydrochlorides and other addition salts with acids, many of which also have sharp melting points.

Reduction of a 2-phenyl-monomethoxyindano-1',2'-oxazolidine to a 2-benzylamino-monomethoxyindanol-1 can be effected with hydrogen under the influence of a hydrogenation catalyst such as the palladium and platinum catalysts previously referred to. The reaction is carried out by dissolving the oxazolidine or its acid addition salt in a suitable solvent, such as anhydrous ethanol, and after adding the catalyst subjecting the mixture to the action of hydrogen until one mol of hydrogen is absorbed for each mol of oxazolidine compound in the reaction mixture. The reaction proceeds readily under atmospheric pressure at ordinary room temperature and is generally substantially complete in about one hour or less. Following the hydrogenation step, the solution can be filtered to remove the catalyst and the acid addition salt of the 2-benzylamino-monomethoxyindanol-1 recovered by diluting the filtrate with ether, ethyl acetate or other suitable liquid to precipitate the addition salt.

Compounds contemplated by the invention which can be prepared by the methods given include, among many others, 2-amino-5-methoxyindanol-1 hydrochloride, 2-amino-6-methoxyindanol-1 hydrochloride, 2-amino-6-methoxyindanol-1 hydrobromide, 2-amino-6-methoxyindanol-1 citrate, 2-amino-6-methoxyindanol-1 succinate, 2-amino-6-methoxyindanol-1 propionate, 2-amino-6-methoxyindanol-1 benzoate, 2-amino-7-methoxyindanol-1 hydrochloride, 2-dimethylamino-5-methoxyindanol-1 hydrochloride, 2-dimethylamino-6-methoxyindanol-1 hydrobromide, 2-dimethylamino-7-methoxyindanol-1 hydrobromide, 2-diethylamino-5-methoxyindanol-1 hydrochloride, 2-di-n-propyl-6-methoxyindanol-1 hydrochloride, 2-monoethylamino-5-methoxyindanol-1 hydrochloride, 2-mono-n-propylamino-5-methoxyindanol-1 hydrochloride, 2-mono-iso-propylamino-6-methoxyindanol-1 hydrochloride, 2-monohexylamino-7-methoxyindanol-1 hydrochloride, 2-monodecylamino-5-methoxyindanol-1 hydrochloride, 2-benzylamino-6-methoxyindanol-1 hydrochloride, 2-(beta-phenylethyl) amino-5-methoxyindanol-1 hydrochloride, and the corresponding free amines.

Certain advantages of the invention are apparent from the following examples which are given by way of illustration only and are not to be construed as limiting.

Example 1

Two grams of active palladium charcoal catalyst were added to a suspension of 9.55 grams of 2-isonitroso-5-methoxyindanone (Chakravarti and Swaminathan, J. Ind. Chem. Soc., 11 101 (1934)) in 100 milliliters of absolute ethanol containing 5.5 grams of dry hydrogen chloride. The suspension was hydrogenated in a Parr hydrogenation apparatus under a pressure of three atmospheres of hydrogen and at a temperature of 60° C. until two molecular proportions of hydrogen had been absorbed. This required about one to two hours. Ethanol was then added and the mixture warmed to dissolve the crystals of 2-amino-5-methoxyindanone-1 hydrochloride which had formed and the catalyst was removed by filtering the hot solution. Ether was added to the filtrate from which, after cooling, 2-amino-5-methoxyindanone-1 hydrochloride separated. The product after crystallization from an alcohol-ether mixture was obtained as a white solid melting with decomposition at 225°–227° C.

Anal.—Calc'd. for $C_{10}H_{12}O_2NCl$: C, 56.21; H, 5.66; N, 6.56. Found: C, 56.22; H, 5.56; N, 6.44.

Likewise, there was obtained from 2-isonitroso-7-methoxyindanone-1, (M. P. 250° C. (dec.) obtained from 7-methoxyindanone-1) 2-amino-7-methoxyindanone-1-hydrochloride decomposing about 250° C.

Anal.—Calc'd. for $C_{10}H_{12}O_2NCl$: C, 56.21; H, 5.66; N, 6.56. Found: C, 56.39; H, 5.62; N, 6.47.

There was also obtained from 2-isonitroso-6-methoxyindanone-1 (Johnson and Shelberg, J. Am. Chem. Soc. 67, 1853 (1945)) 2-amino-6-methoxyindanone-1 hydrochloride decomposing between 210° and 232° C. depending upon the rate of heating.

Anal.—Calc'd. for $C_{10}H_{12}O_2NCl$: C, 56.21; H, 5.66; N, 6.56. Found: C, 56.32; H, 5.68; N, 6.65.

Similar results are obtained and the corresponding salts prepared using hydrogen bromide, citric acid, propionic acid, phosphoric acid or other convenient acid instead of hydrogen chloride.

Example 2

A mixture of 10.7 grams of 2-amino-5-methoxyindanone-1 hydrochloride, 100 milliliters of distilled water and 1.0 gram of active palladium-charcoal catalyst was shaken under a pressure of 2 atmospheres of hydrogen at a temperature of about 60° C. for about five hours. The mixture was then filtered to remove the catalyst and the filtrate evaporated to dryness. The residue was dissolved in hot ethanol, the solution treated with decolorizing charcoal, filtered, cooled and again filtered. The white crystalline 2-amino-5-methoxyindanol-1 hydrochloride thus obtained softened rapidly when immersed in a bath at 165° C. but only slowly when immersed in a bath at 160° C.

Anal.—Calc'd. for $C_{10}H_{14}O_2NCl$: C, 55.68; N, 6.50; H, 6.54. Found: C, 55.78; N, 6.54; H, 6.62.

In similar manner the following compounds were prepared:

2-amino-6-methoxyindanol-1 hydrochloride melting with decomposition at 220° C.

Anal.—Calc'd. for $C_{10}H_{14}O_2NCl$: C, 55.68; N, 6.50; H, 6.54. Found: C, 55.65; N, 6.56; H, 6.53.

2-amino-7-methoxyindanol-1 hydrochloride melting with decomposition at 170° C.

Anal.—Calc'd. for $C_{10}H_{14}O_2NCl$: C, 55.68; N, 6.50; H, 6.54. Found: C, 55.69; N, 6.44; H, 6.68.

2-amino-5-methoxyindanol-1, 2-amino-6-methoxyindanol-1 and 2-amino-7-methoxyindanol-1 are prepared by neutralizing an aqueous solution of the corresponding hydrochloride with sodium bicarbonate, extracting the neutralized mixture with ether, drying the ether extract and evaporating the ether.

Example 3

A mixture of 2.16 grams of 2-amino-5-methoxyindanol-1 hydrochloride from Example 2, 50 milliliters of ethyl alcohol, 1.20 grams of benzaldehyde and 0.84 gram of sodium bicarbonate was refluxed for six hours. The mixture was then cooled to room temperature, filtered to remove crystalline sodium chloride and the filtrate concentrated to about one-third of its original volume. Water was added to the concentrated filtrate and the mixture cooled. The white solid which separated was recovered by filtering and then dissolved in 15 milliliters of boiling 95 per cent ethanol. The hot solution was treated with decolorizing charcoal, filtered and cooled. A precipitate of unreacted 2-amino-5-methoxyindanol-1 which formed was separated by filtering and the filtrate was diluted with water. The precipitate which formed was recovered by filtering and dried. The 2-phenyl-6-methoxyindano-1',2'-oxazolidine thus obtained melted at about 85° C. and was converted to the hydrochloride by treating it with dry ethereal hydrogen chloride. The 2-phenyl-6-methoxyindano-1',2'-oxazolidine hydrochloride melted with decomposition at 154.5° C. after crystallization from a mixture of alcohol and ether.

Anal.—Calc'd. for $C_{17}H_{18}O_2NCl$: C, 67.21; H, 5.97; N, 4.61. Found: C, 67.16; H, 5.69; N, 4.60.

2-phenyl-7-methoxyindano-1',2'-oxazolidine melting at 80°–82° C. was prepared in similar manner. The hydrochloride melts at about 137° C. and hydrolyzes slowly during recrystallization from water-containing solvents.

2-phenyl-8-methoxyindano-1',2'-oxazolidine melting at 150.5°–152° C. was also prepared in similar manner. The hydrochloride melts at 187.5° C. with decomposition.

Anal.—Calc'd. for $C_{17}H_{18}O_2NCl$: C, 67.21; H, 5.97; N, 4.61. Found: C, 67.01; H, 5.97; N, 4.64.

Example 4

2-phenyl-6-methoxyindano-1',2'-oxazolidine hydrochloride prepared as in Example 3 was dissolved in absolute alcohol, an active palladium on charcoal catalyst was added and the suspension was hydrogenated at room temperature under atmospheric pressure. When one molecular proportion of hydrogen had been absorbed, which point was reached in about 45 minutes, hydrogenation was discontinued. The catalyst was removed by filtration, the filtrate was evaporated to dryness and the residue recrystallized from a mixture of absolute alcohol and ether. The 2-benzylamino-5-methoxyindanol-1 hydrochloride thus obtained melted at 189.5° C.

Anal.—Calc'd. for $C_{17}H_{20}O_2NCl$: C, 66.77; H, 6.59; N, 4.58. Found: C, 66.56; H, 6.60; N, 4.62.

2-benzylamino-6-methoxyindanol-1 hydrochloride melting at 211°–213° C. was prepared in similar manner.

Anal.—Calc'd. for $C_{17}H_{20}O_2NCl$: C, 66.77; H, 6.59; N, 4.58. Found: C, 66.56; H, 6.79; N, 4.60.

2-benzylamino-7-methoxyindanol-1 hydrochloride melting at 180°–181° C. was also prepared in similar manner.

Anal.—Calc'd. for $C_{17}H_{20}O_2NCl$: C, 66.77; H, 6.59, N, 4.58. Found: C, 66.75; H, 6.75; N, 4.52.

*Example 5*

A mixture of 2.15 grams of 2-amino-6-methoxyindanol-1 hydrochloride, 1.06 grams of sodium carbonate and 50 milliliters of absolute ethanol was warmed for ten minutes and 2.0 grams of 37 per cent formaldehyde solution added. The resulting mixture was added to a suspension of 0.5 gram of reduced Adams platinum catalyst in absolute ethanol and subjected to hydrogenation at room temperature under a hydrogen pressure of two atmospheres. The theoretical quantity of hydrogen was absorbed in one hour. The catalyst was removed by filtration, the filtrate was concentrated to 20 milliliters and poured into a large volume of ethereal hydrogen chloride and the mixture cooled and filtered. Upon crystallization of the precipitate from absolute ethanol 2-dimethylamino-6-methoxyindanol-1 hydrochloride was obtained in the form of white crystals melting at 215°–215.5° C. (dec.).

Anal.—Calc'd. for $C_{12}H_{18}O_2NCl$: C, 59.13; H, 7.44; N, 5.75. Found: C, 59.07; H, 7.23; N, 5.84.

2-benzylamino-6-methoxyindanol-1 hydrochloride, identical with that obtained by the method of Example 4, was obtained in similar manner using benzaldehyde instead of formaldehyde.

*Example 6*

A mixture of 4.31 grams of 2-amino-6-methoxyindanol-1 hydrochloride, 1.6 milliliters of acetone, 2.12 grams of sodium carbonate and 50 milliliters of absolute alcohol was added to 0.5 gram of reduced Adams platinum catalyst in 25 milliliters of absolute ethanol. The mixture was hydrogenated at ordinary room temperature under a hydrogen pressure of two atmospheres. Reduction was complete in one hour and the filtrate from the catalyst was poured into cold ethereal hydrogen chloride and the solution cooled. A precipitate was formed which after recrystallization from absolute alcohol consisted of white crystals of 2-isopropylamino-6-methoxyindanol-1 hydrochloride melting at 214° C. (dec.).

Anal.—Calc'd. for $C_{13}H_{20}O_2NCl$: C, 60.57; H, 7.82; N, 5.44. Found: C, 60.54; H, 7.66; N, 5.29.

I claim:

1. A compound from the group consisting of mono-substituted aminoindanols having the formula

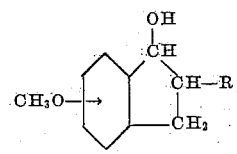

wherein the methoxy radical is attached to a carbon atom of the 6-membered ring other than that in the 4 position and R is from the group consisting of the amino, monoalkylamino, lower di-n-alkylamino and monoaralkylamino radicals, and addition salts thereof with acids.

2. 2-amino-5-methoxyindanol-1 hydrochloride.
3. 2-amino-6-methoxyindanol-1 hydrochloride.
4. 2-benzylamino-5-methoxyindanol-1 hydrochloride.
5. 2-benzylamino-6-methoxyindanol-1 hydrochloride.
6. 2-dimethylamino-6-methoxyindanol-1 hydrochloride.

RICHARD V. HEINZELMANN.

REFERENCES CITED

The following references are of record in the file of this patent:

UNITED STATES PATENTS

| Number | Name | Date |
|---|---|---|
| 2,359,707 | Baltzly et al. | Oct. 3, 1944 |

FOREIGN PATENTS

| Number | Country | Date |
|---|---|---|
| 8,957 | Great Britain | 1912 |
| 747,028 | France | June 9, 1933 |

OTHER REFERENCES

Levin et al., "J. Am. Chem. Soc.," vol. 9, pp. 380–391 (1944).

Heinzelmann et al., "J. Am. Chem. Soc.," vol. 70, pp. 1386–1390 (1948).